United States Patent
Sambandan et al.

(10) Patent No.: US 9,433,933 B2
(45) Date of Patent: Sep. 6, 2016

(54) TITANIA PHOTOCATALYTIC COMPOUNDS AND METHODS OF MAKING THE SAME

(71) Applicant: Nitto Denko Corporation, Osaka (JP)

(72) Inventors: Ekambaram Sambandan, Carlsbad, CA (US); Rajesh Mukherjee, Irvine, CA (US); Takuya Fukumura, Carlsbad, CA (US)

(73) Assignee: NITTO DENKO CORPORATION, Osaka (JP)

(*) Notice: Subject to any disclaimer, the term of this patent is extended or adjusted under 35 U.S.C. 154(b) by 686 days.

(21) Appl. No.: 13/741,191

(22) Filed: Jan. 14, 2013

(65) Prior Publication Data

US 2013/0192976 A1    Aug. 1, 2013

Related U.S. Application Data

(60) Provisional application No. 61/587,889, filed on Jan. 18, 2012.

(51) Int. Cl.
*B01J 27/24* (2006.01)
*B01J 19/12* (2006.01)
*B01J 37/08* (2006.01)
(Continued)

(52) U.S. Cl.
CPC ............ *B01J 27/24* (2013.01); *B01J 19/123* (2013.01); *B01J 19/127* (2013.01); *B01J 19/128* (2013.01); *B01J 21/063* (2013.01); *B01J 23/06* (2013.01); *B01J 23/14* (2013.01); *B01J 23/626* (2013.01); *B01J 23/66* (2013.01); *B01J 27/22* (2013.01); *B01J 35/004* (2013.01); *B01J 37/086* (2013.01); *B01J 37/088* (2013.01)

(58) Field of Classification Search
None
See application file for complete search history.

(56) References Cited

U.S. PATENT DOCUMENTS 3,701,739 A * 10/1972 Bovarnick et al. ........... 502/318
6,306,361 B1   10/2001 Shin et al.
(Continued)

FOREIGN PATENT DOCUMENTS

CN      1931426 A    3/2007
CN    101219377 A    7/2008
(Continued)

OTHER PUBLICATIONS

Cheng et al., "Effect of Preparation Conditions on Visible Photocatalytic Activity of Titania Synthesized by Solution Combustion Method," Chinese Journal of Chemical Engineering, 2007, vol. 15, No. 2, pp. 178-183.
(Continued)

*Primary Examiner* — Melvin C Mayes
*Assistant Examiner* — Stefanie Cohen
(74) *Attorney, Agent, or Firm* — K&L Gates LLP; Brent A. Johnson; Louis C. Cullman

(57) ABSTRACT

Disclosed herein are titania photocatalysts, titania photocatalytic compositions, and methods of making the same. The photocatalysts may, for example, be represented by the formula of $(Ti_{1-r}M_r)(O_{2-x-y}C_xN_y)$, where M, r, x, are y defined in the specification. The photocatalysts may, in some embodiments, provide superior photocatalytic activity relative to titania. Also disclosed are methods making the photocatalysts. The method may provide economical techniques for obtaining the titania photocatalysts.

18 Claims, 4 Drawing Sheets

(51) Int. Cl.
*B01J 21/06* (2006.01)
*B01J 23/06* (2006.01)
*B01J 23/14* (2006.01)
*B01J 23/62* (2006.01)
*B01J 23/66* (2006.01)
*B01J 27/22* (2006.01)
*B01J 35/00* (2006.01)

(56) References Cited

U.S. PATENT DOCUMENTS

| | | | |
|---|---|---|---|
| 6,365,545 | B1 | 4/2002 | Komatsu et al. |
| 7,544,631 | B2 | 6/2009 | Choi et al. |
| 7,795,173 | B2 | 9/2010 | Vanderspurt et al. |
| 8,703,638 | B2 | 4/2014 | Wakizaka et al. |
| 9,093,714 | B2 | 7/2015 | Wakizaka et al. |
| 9,136,541 | B2 | 9/2015 | Lee et al. |
| 9,236,641 | B2 | 1/2016 | Shishikura |
| 2011/0008709 | A1 | 1/2011 | Shishikura et al. |
| 2011/0183234 | A1 | 7/2011 | Wakizaka et al. |
| 2012/0003548 | A1 | 1/2012 | Shishikura |
| 2012/0070763 | A1* | 3/2012 | Monden et al. .............. 429/480 |
| 2012/0083407 | A1* | 4/2012 | Shishikura .............. C01B 31/04 502/171 |
| 2012/0315568 | A1 | 12/2012 | Lee et al. |
| 2014/0170526 | A1 | 6/2014 | Wakizaka et al. |

FOREIGN PATENT DOCUMENTS

| | | | | |
|---|---|---|---|---|
| CN | 101 259 422 | | 9/2008 | |
| CN | 101301619 | A | 11/2008 | |
| CN | 101 703 948 | | 5/2010 | |
| DE | 102 33 193 | | 2/2003 | |
| GB | WO 2008009919 | A1 * | 1/2008 | .............. B01J 27/24 |
| JP | 2004-082088 | A | 3/2004 | |
| JP | 2009-023887 | A | 5/2009 | |
| JP | 2011-063473 | A | 3/2011 | |
| WO | 2005-014170 | A1 | 2/2005 | |
| WO | WO 2008/009919 | | 1/2008 | |
| WO | 2009-107518 | A1 | 3/2009 | |
| WO | 2010-041658 | A1 | 4/2010 | |
| WO | 2010-107028 | A1 | 9/2010 | |
| WO | 2011-099493 | A1 | 8/2011 | |

OTHER PUBLICATIONS

Nagaveni et al., "Structure and Photocatalytic Activity of Ti1–xMxO2±δ (M = W, V, Ce, Zr, Fe, and Cu) Synthesized by Solution Combustion Method," Journal of Physical Chemistry, Nov. 2004, vol. 108, No. 52, pp. 20204-20212.
International Search Report and Written Opinion in PCT Application No. PCT/US2013/021480 dated Jul. 2, 2013.
Cao et al., "Improved Photocatalytic Activity of Sn4+ doped TiO2 Nanoparticulate Films Prepared by Plasma-Enhanced Chemical Vapor Deposition", New Journal of Chemistry, 2004, vol. 28, pp. 218-222.
Dorf KetalTyzor®:Organic Titanates and Zirconates, "Surface Modifiers for Improved Properties and Metal Oxide Formation", printed May 13, 2011 in 3 pages.
Wang et al., "Improved Visible Light Photocatalytic Activity of Titania Doped With Tin and Nitrogen", Journal of Materials Chemistry, 2011, vol. 21, pp. 144-150.
Xie et al., "In Situ Controllable Loading of Ultrafine Noble Metal Particles on Titania", Journal of American Chemical Society, 2009, vol. 131, pp. 6648-6649.
Zaleska, Adriana, "Doped-TiO2: A Review", Recent Patents on Engineering, 2008, vol. 2, pp. 157-164.
CN—OA 201380005438.2 on Nov. 4, 2015.
Journal of Hazardous Materials, vol. 161 pp. 396-401, 2009.
Pramana—J. Phys, vol. 65, No. 4 pp. 641-645, Oct. 2005.
Taiwanese Office Action dated May 25, 2016.
Japanese Office Action for JP2014-553337 drafted on Jun. 21, 2016 and issued on Jun. 28, 2016.

* cited by examiner

US 9,433,933 B2

TITANIA PHOTOCATALYTIC COMPOUNDS AND METHODS OF MAKING THE SAME

CROSS-REFERENCE TO RELATED APPLICATIONS

This application claims the benefit of priority to U.S. Application No. 61/587,889, which is hereby incorporated by reference in its entirety.

BACKGROUND

1. Field

The present application relates to the field of chemistry, and in particular, photocatalytic materials.

2. Description

The photocatalytic activity of titania was first discovered in 1972 by Fujishima and Honda. Titania has since served as a first generation catalyst for photo-assisted decontamination of organic contaminants in aqueous and atmospheric systems. Much research activity has been directed to improve the photo-catalysis of $TiO_2$ under ultra-violet or visible irradiation. Titania has been modified with various noble metals and transition metals, such as gold, silver, platinum, iron, and copper, in attempts to improve the photocatalytic activity for titania. Generally, the cost and position of the conduction band of the noble metals and transitions metals have not been suitable for improving the photocatalytic activity of titania.

SUMMARY

Some embodiments disclosed herein include titanium-oxide based photocatalysts. Some embodiments disclosed herein include methods of making a photocatalytic composition. Some embodiments disclosed herein include methods of photocatalytically decomposing materials using titanium-oxide based compositions.

Some embodiments disclosed herein include a titanium-oxide based photocatalyst represented by the formula of $(Ti_{1-r}M_r)(O_{2-x-y}C_xN_y)$, where: M is selected from the group consisting of Sn, Ni, Sr, Ba, Fe, Bi, V, Mo, W, Zn, Cu, and combinations thereof; r is in the range of about 0.0001 to about 0.25; x is in the range of about 0.001 to about 0.1; and y is in the range of about 0.001 to about 0.1.

In some embodiments, r is no more than about 0.20. In some embodiments, r is no more than about 0.15. In some embodiments, r is no more than about 0.05. In some embodiments, M is selected from the group consisting of Sn, Ni, Sr, Ba, Fe, Bi, and combinations thereof. In some embodiments, r is in the range of about 0.0001 to about 0.15. In some embodiments, M is selected from the group consisting of Mo, W, and combinations thereof. In some embodiments, r is in the range of about 0.0001 to about 0.10. In some embodiments, M is V. In some embodiments, r is in the range of about 0.0001 to about 0.05. In some embodiments, M is Sn. In some embodiments, r is at least about 0.001. In some embodiments, r is at least about 0.01. In some embodiments, r is at least about 0.1. In some embodiments, x is in the range of about 0.001 to about 0.07. In some embodiments, y is in the range of about 0.001 to about 0.05.

In some embodiments, the photocatalyst is selected from the group consisting of $(Ti_{0.99}Sn_{0.01})(O_{2-x-y}C_xN_y)$, $(Ti_{0.97}Sn_{0.03})(O_{2-x-y}C_xN_y)$, $(Ti_{0.95}Sn_{0.05})(O_{2-x-y}C_xN_y)$, $(Ti_{0.90}Sn_{0.10})(O_{2-x-y}C_xN_y)$, $(Ti_{0.85}Sn_{0.15})(O_{2-x-y}C_xN_y)$, $(Ti_{0.985}Ni_{0.015})(O_{2-x-y}C_xN_y)$, $(Ti_{0.98}Ni_{0.02})(O_{2-x-y}C_xN_y)$, $(Ti_{0.97}Ni_{0.03})(O_{2-x-y}C_xN_y)$, $(Ti_{0.99}Sr_{0.01})(O_{2-x-y}C_xN_y)$, $(Ti_{0.97}Sr_{0.03})(O_{2-x-y}C_xN_y)$, $(Ti_{0.95}Sr_{0.05})(O_{2-x-y}C_xN_y)$, $(Ti_{0.97}Ba_{0.03})(O_{2-x-y}C_xN_y)$, $(Ti_{0.95}Ba_{0.05})(O_{2-x-y}C_xN_y)$, $(Ti_{0.94}Sn_{0.05}Fe_{0.01})(O_{2-x-y}C_xN_y)$, $(Ti_{0.94}Sn_{0.05}Ni_{0.01})(O_{2-x-y}C_xN_y)$, $(Ti_{0.99}Fe_{0.01})(O_{2-x-y}C_xN_y)$, $(Ti_{0.95}Zn_{0.05})(O_{2-x-y}C_xN_y)$, $(Ti_{0.77}Sn_{0.15}Cu_{0.08})(O_{2-x-y}C_xN_y)$, $(Ti_{0.85}Zn_{0.15})(O_{2-x-y}C_xN_y)$, $(Ti_{0.90}Bi_{0.10})(O_{2-x-y}C_xN_y)$, $(Ti_{0.996}V_{0.004})(O_{2-x-y}C_xN_y)$, $(Ti_{0.984}V_{0.016})(O_{2-x-y}C_xN_y)$, $(Ti_{0.970}V_{0.03})(O_{2-x-y}C_xN_y)$, $(Ti_{0.997}Mo_{0.003})(O_{2-x-y}C_xN_y)$, $(Ti_{0.984}Mo_{0.016})(O_{2-x-y}C_xN_y)$, $(Ti_{0.957}Mo_{0.043})(O_{2-x-y}C_xN_y)$, $(Ti_{0.97}W_{0.03})(O_{2-x-y}C_xN_y)$, and $(Ti_{0.95}W_{0.05})(O_{2-x-y}C_xN_y)$.

In some embodiments, the photocatalyst is selected from the group consisting of $(Ti_{0.95}Sn_{0.05})(O_{2-x-y}C_xN_y)$, $(Ti_{0.90}Sn_{0.10})(O_{2-x-y}C_xN_y)$, and $(Ti_{0.85}Sn_{0.15})(O_{2-x-y}C_xN_y)$.

In some embodiments, x is at least about 0.001.
In some embodiments, x is no more than about 0.08.
In some embodiments, y is at least about 0.001.
In some embodiments, y is no more than about 0.050.
In some embodiments, the photocatalyst comprises an anatase phase.

Some embodiments disclosed herein include a composition having any of the photocatalysts disclosed in the present application. In some embodiments, the composition includes a noble metal.

In some embodiments, the noble metal is selected from the group consisting of Pt, Ag, Au, Rh, Rb, Re, Ir and combinations thereof.

In some embodiments, the noble metal is selected from the group consisting of Pt, Ag, and combination thereof.

Some embodiments disclosed herein include a method of photocatalytically decomposing a compound, the method include: contacting the compound with the any of the photocatalysts disclosed in the present application; and exposing the photocatalyst to electromagnetic radiation having a wavelength between about 200 nm to about 800 nm.

Some embodiments disclosed herein include a method of making a photocatalytic composition, the method including: heating a mixture at a first temperature in the range of about 100° C. to about 800° C. for a heating time of at least about 10 seconds to form a solid, where the mixture includes: a titanium compound; and at least one second metallic compound that comprises at least a second metal element, where the molar ratio of the titanium to the second metal element in the mixture is in the range of about 10,000:1 to about 3:1; and heating the solid at a second temperature in the range of about 150° C. to about 650° C. for at least about 1 minute to obtain a photocatalytic composition.

In some embodiments, the titanium compound is an organo-titanium compound.

In some embodiments, the organo-titanium compound is selected from the group of a compound represented by Formula I, ammonium oxo-oxalatotitanate (IV), hydroxy-carboxylato-peroxotitanium, titanium lactate, titanium maleate complexes, titanium citrate, and combinations thereof:

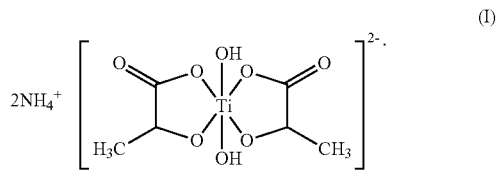

In some embodiments, the at least one second metal element is selected from the group consisting of Sn, Ni, Sr, Ba, Fe, Bi, V, Mo, W, Zn, Cu, and combinations thereof.

In some embodiments, the second metal element is Sn.

In some embodiments, the second metallic compound is an organometallic compound.

In some embodiments, the organometallic compound is selected from the group consisting of stannous octoate, tin(IV)-oxine complexes, dibutyl tin, tetrabutyl tin, metallocenes including ferrocene, nickelocene, ferrates, vanadates, molybdates, zincates, cuprates, and combinations thereof.

In some embodiments, the mixture further includes a combustible compound.

In some embodiments, the combustible compound is selected from the group consisting of urea, hydrazine-based compounds like carbohydrazide, amino acids including glycine, leucine, valine, serine, alanine; 3-methylpyrozole-5-one, diformyl hydrazine, and hexamethylenetetramine.

In some embodiments, the mixture further comprises an oxidizing agent.

In some embodiments, the oxidizing agent is selected from the group consisting of ammonium nitrate, hydrogen peroxide, and guanidine nitrate.

In some embodiments, the mixture further comprises a noble metal compound.

In some embodiments, the noble metal compound comprises Pt, Ag, Au, Rh, Rb, Re, and/or Ir.

In some embodiments, the noble metal compound comprises silver nitrate, tetramine platinum(II) nitrate, rhodium nitrate, platinum (II) oxalate, or silver lactate.

In some embodiments, at least about 95% by weight of the mixture is comprised of a combined amount of elements selected from the group consisting of carbon, hydrogen, oxygen, tin, nickel, strontium, barium, iron, bismuth, vanadium, molybdenum, and tungsten.

In some embodiments, the photocatalytic composition is represented by the formula of $(Ti_{1-r}M_r)(O_{2-x-y}C_xN_y)$, wherein: M is selected from Sn, Ni, Sr, Ba, Fe, Bi, V, Mo, W, Zn, Cu and combinations thereof; r is in the range of about 0.0001 to about 0.25; x is in the range of about 0.001 to about 0.1; and y is in the range of about 0.001 to about 0.1.

DETAILED DESCRIPTION

Figure 1:
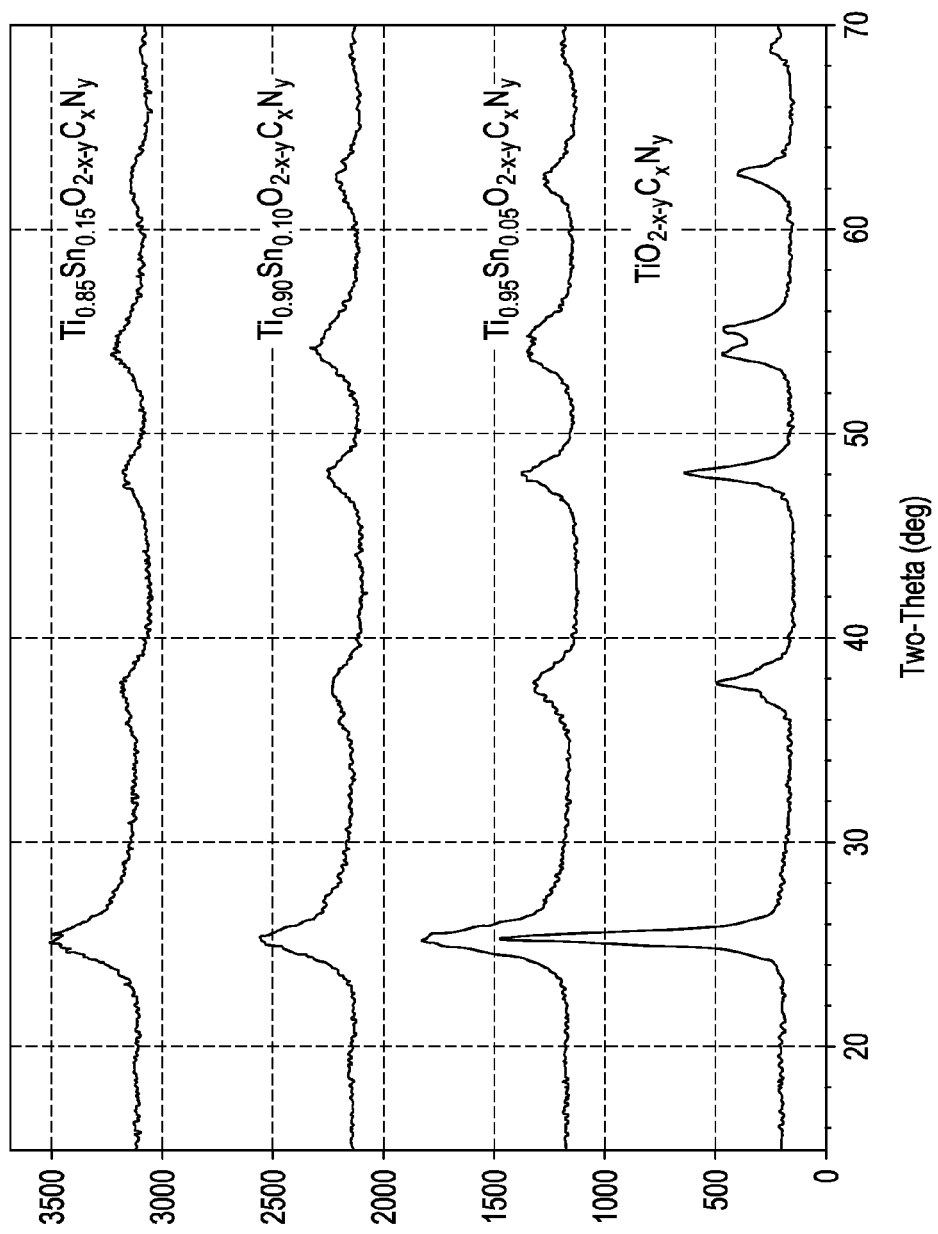
FIG. 1 shows powder x-ray diffraction patterns for Compounds D, E, F, and G prepared according to Examples 2 and 3.

Disclosed herein are titania photocatalysts, titania photocatalytic compositions, and methods of making the same. The photocatalysts may, for example, be represented by the formula of $(Ti_{1-r}M_r)(O_{2-x-y}C_xN_y)$, where M, r, x, and y defined further below. The photocatalysts may, in some embodiments, provide superior photocatalytic activity relative to titania. Also disclosed are methods for making the photocatalysts. The methods may provide economical techniques for obtaining the titania photocatalysts.

Titania Photocatalysts

Some embodiments disclosed herein include a titanium-oxide based photocatalyst represented by the formula of $(Ti_{1-r}M_r)(O_{2-x-y}C_xN_y)$, where: M is Sn, Ni, Sr, Ba, Fe, Bi, V, Mo, W, Zn, Cu, or combinations thereof; r is in the range of about 0.0001 to about 0.25; x is in the range of about 0.001 to about 0.1; and y is in the range of about 0.001 to about 0.1. In some embodiments M is $Sn^{2+}$, $Sn^{4+}$, $Ni^{2+}$, $Sr^{2+}$, $Ba^{2+}$, $Fe^{3+}$, $Bi^{3+}$, $V^{5+}$, $Mo^{6+}$, $W^{6+}$, $Zn^{2+}$, $Cu^{2+}$, or combinations thereof. In some embodiments, the photocatalyst degrades organic materials when exposed to ultra-violet and/or visible light radiation.

M can be Sn, Ni, Sr, Ba, Fe, Bi, V, Mo, W, Zn, Cu, or any combinations thereof. In some embodiments, M can be $Sn^{2+}$, $Sn^{4+}$, $Ni^{2+}$, $Sr^{2+}$, $Ba^{2+}$, $Fe^{3+}$, $Bi^{3+}$, $V^{5+}$, $Mo^{6+}$, $W^{6+}$, $Zn^{2+}$, $Cu^{2+}$, or any combinations thereof. In some embodiments, M can be Sn, Ni, Sr, Ba, Fe, Bi, or combinations thereof. In some embodiments, M can be $Sn^{2+}$, $Sn^{4+}$, $Ni^{2+}$, $Sr^{2+}$, $Ba^{2+}$, $Fe^{3+}$, $Bi^{3+}$, or combinations thereof. In some embodiments, M is selected from Mo, W, and combinations thereof. In some embodiments, M is selected from $Mo^{6+}$, $W^{6+}$, and combinations thereof. In some embodiments, M can be Sn. In some embodiments, M can be $Sn^{2+}$, $Sn^{4+}$, and combinations thereof M may be a combination of at least two elements (e.g., two, three, four, five, or more elements). As an example M may be a combination of a first element and second element, each selected from Sn, Ni, Sr, Ba, Fe, Bi, V, Mo, W, Zn, and Cu. As an example M may be a combination of a first element and second element, each selected from $Sn^{2+}$, $Sn^{4+}$, $Ni^{2+}$, $Sr^{2+}$, $Ba^{2+}$, $Fe^{3+}$, $Bi^{3+}$, $V^{5+}$, $Mo^{6+}$, $W^{6+}$, $Zn^{2+}$, and $Cu^{2+}$. The molar ratio of the first element to the second element can be, for example, at least about 10 to 90; at least about 20 to 80; at least about 40 to 60; or at least about 1 to 1. The molar ratio of the first element to the second element can also be, for example, no more than about 90 to 10; no more than about 80 to 20; no more than about 60 to 40; or no more than about 1 to 1. In some embodiments, M is a combination where the first element is Sn. In some embodiments, M is a combination where the first element is $Sn^{2+}$ and/or $Sn^{4+}$. In some embodiments, M is a combination where the first element is Sn and the second element is selected from Ni, Fe, and Cu, and combinations thereof. In some embodiments, M is a combination where the first element is $Sn^{4+}$ and the second element is selected from $Ni^{2+}$, $Fe^{3+}$, and $Cu^{2+}$, and combinations thereof. In some embodiments, M is a combination where the first element is $Sn^{2+}$ and the second element is selected from $Ni^{2+}$, $Fe^{3+}$, and $Cu^{2+}$, and combinations thereof. In some embodiments, M is only one element. For example, M can be only Sn. For example, M can be only $Sn^{4+}$.

The amount of M in the photocatalyst is not particularly limited. r can be, for example, no more than about 0.25; no more than about 0.20; no more than about 0.15; no more than about 0.10; no more than about 0.08; or no more than about 0.05. r can also be, for example, at least about 0.0001; at least about 0.001; at least about 0.005; at least about 0.001; at least about 0.03; at least about 0.05; or at least about 0.10. In some embodiments, r can be in the range of about 0.0001 to about 0.25. In some embodiments, r can be in the range of about 0.0001 to about 0.15. In some embodiments, r can be in the range of about 0.0001 to about 0.05. In some embodiments, M is V and r is the range of about 0.0001 to about 0.05. In some embodiments, M is $V^{5+}$ and r is the range of about 0.0001 to about 0.05. In some embodiments, M is Mo or W, and r is the range of about 0.0001 to about 0.10. In some embodiments, M is $Mo^{6+}$ or $W^{6+}$, and r is the range of about 0.0001 to about 0.10.

Non-limiting examples of values for r include about 0.05, about 0.10, about 0.15, or about 0.20.

The amount of carbon in the photocatalyst may also be varied. x can be, for example, at least about 0.001; at least about 0.008; at least about 0.01; at least about 0.02; at least about 0.03; at least about 0.04; or at least about 0.05. x can also be, for example, no more than about 0.10; no more than about 0.08; no more than about 0.07; no more than about 0.06; no more than about 0.05; no more than about 0.04; no more than about 0.03; or no more than about 0.02. In some embodiments, x can be in the range of about 0.001 to about 0.1. In some embodiments, x can be in the range of about 0.008 to about 0.07. In some embodiments, x can be in the range of about 0.004 to about 0.08. Non-limiting examples of values for x include about 0.08, about 0.01, about 0.02, about 0.04, and about 0.05.

The amount of nitrogen in the photocatalyst is also not particularly limited. y can be, for example, at least about 0.001; at least about 0.005; at least about 0.01; at least about 0.02; at least about 0.025; at least about 0.03; or at least about 0.04. y can also be, for example, no more than about 0.1; no more than about 0.08; no more than about 0.05; no more than about 0.04; no more than about 0.03; no more than about 0.02; or no more than about 0.01. In some embodiments, y can be in the range about 0.005 to about 0.05. In some embodiments, y can be in the range about 0.001 to about 0.1. Non-limiting examples of values for y include about 0.005, about 0.01, and about 0.04.

Numerous photocatalysts are within the scope of the present application. In some embodiments, the titanium-oxide based photocatalyst represented by the formula of $(Ti_{1-r}M_r)(O_{2-x-y}C_xN_y)$, where: M is Sn; r is selected from about 0.01, about 0.03, about 0.05, about 0.10, or about 0.15; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Sn^{2+}$; r is selected from about 0.01, about 0.03, about 0.05, about 0.10, or about 0.15; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Sn^{4+}$; r is selected from about 0.01, about 0.03, about 0.05, about 0.10, or about 0.15; x is in the range of about 0.001 to about 0.1; and y is in the range of about 0.001 to about 0.1. For example, the photocatalyst can be $(Ti_{0.99}Sn_{0.01})(O_{2-x-y}C_xN_y)$, $(Ti_{0.97}Sn_{0.03})(O_{2-x-y}C_xN_y)$, $(Ti_{0.95}Sn_{0.05})(O_{2-x-y}C_xN_y)$, $(Ti_{0.90}Sn_{0.10})(O_{2-x-y}C_xN_y)$, or $(Ti_{0.85}Sn_{0.15})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Ni; r is selected from about 0.015, about 0.02, or about 0.03; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Ni^{2+}$; r is selected from about 0.015, about 0.02, or about 0.03; x is in the range of about 0.001 to about 0.1; and y is in the range of about 0.001 to about 0.1. For example, the photocatalyst can be $(Ti_{0.985}Ni_{0.015})(O_{2-x-y}C_xN_y)$, $(Ti_{0.98}Ni_{0.02})(O_{2-x-y}C_xN_y)$, or $(Ti_{0.97}Ni_{0.03})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Sr; r is selected from about 0.01, about 0.03, or about 0.05; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Sr^{2+}$; r is selected from about 0.01, about 0.03, or about 0.05; x is in the range of about 0.001 to about 0.1; and y is in the range of about 0.001 to about 0.1. For example, the photocatalyst can be $(Ti_{0.99}Sr_{0.01})(O_{2-x-y}C_xN_y)$, $(Ti_{0.97}Sr_{0.03})(O_{2-x-y}C_xN_y)$, or $(Ti_{0.95}Sr_{0.05})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Ba; r is selected from about 0.03 or about 0.05; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Ba^{2+}$; r is selected from about 0.03 or about 0.05; x is in the range of about 0.001 to about 0.1; and y is in the range of about 0.001 to about 0.1. For example, the photocatalyst can be $(Ti_{0.97}Ba_{0.03})(O_{2-x-y}C_xN_y)$ or $(Ti_{0.95}Ba_{0.05})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Fe; r is about 0.01; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Fe^{3+}$; r is about 0.01; x is in the range of about 0.001 to about 0.1; and y is in the range of about 0.001 to about 0.1. For example, the photocatalyst can be $(Ti_{0.99}Fe_{0.01})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Zn; r is selected from about 0.05 or about 0.15; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Zn^{2+}$; r is selected from about 0.05 or about 0.15; x is in the range of about 0.001 to about 0.1; and y is in the range of about 0.001 to about 0.1. For example, the photocatalyst can be $(Ti_{0.95}Zn_{0.05})(O_{2-x-y}C_xN_y)$ or $(Ti_{0.85}Zn_{0.15})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Bi; r is about 0.1; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Bi^{3+}$; r is about 0.1; x is in the range of about 0.001 to about 0.1; and y is in the range of about 0.001 to about 0.1. For example, the photocatalyst can be $(Ti_{0.9}Bi_{0.1})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is V; r is selected from about 0.004, about 0.016, or about 0.03; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $V^{5+}$; r is selected from about 0.004, about 0.016, or about 0.03; x is in the range of about 0.001 to about 0.1; and y is in the range of about 0.001 to about 0.1. For example, the photocatalyst can be $(Ti_{0.996}V_{0.004})(O_{2-x-y}C_xN_y)$, $(Ti_{0.984}V_{0.016})(O_{2-x-y}C_xN_y)$, or $(Ti_{0.970}V_{0.03})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Mo; r is selected from about 0.003, about 0.016, or about 0.043; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Mo^{6+}$; r is selected from about 0.003, about 0.016, or about 0.043; x is in the range of about 0.001 to about 0.1; and y is in the range of about 0.001 to about 0.1. For example, the photocatalyst can be $(Ti_{0.997}Mo_{0.003})(O_{2-x-y}C_xN_y)$, $(Ti_{0.984}Mo_{0.016})(O_{2-x-y}C_xN_y)$, or $(Ti_{0.957}Mo_{0.043})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is W; r is selected from about 0.03 or about 0.05; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $W^{6+}$; r is selected from about 0.03 or about 0.05; x is in the range of about 0.001 to about 0.1; and y is in the range of about 0.001 to about 0.1. For example, the photocatalyst can be $(Ti_{0.97}W_{0.03})(O_{2-x-y}C_xN_y)$ or $(Ti_{0.95}W_{0.05})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Sn and a second element selected from Fe, Ni, and Cu; r is selected from about 0.06, or about 0.23; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Sn^{4+}$ and a second element selected from $Fe^{3+}$, $Ni^{2+}$, and $Cu^{2+}$; r is selected from about 0.06, or about 0.23; x is in the range of about 0.001 to about 0.1; and y is in the range of about 0.001 to about 0.1. For example, the photocatalyst can be $(Ti_{0.94}Sn_{0.05}Fe_{0.01})(O_{2-x-y}C_xN_y)$, $(Ti_{0.94}Sn_{0.05}Ni_{0.01})(O_{2-x-y}C_xN_y)$, or $(Ti_{0.77}Sn_{0.15}Cu_{0.08})(O_{2-x-y}C_xN_y)$, where: x is in the range of about 0.001 to about 0.1; and y is in the range of about 0.001 to about 0.1.

In some embodiments, the titanium-oxide based photocatalyst represented by the formula of $(Ti_{1-r}M_r)(O_{2-x-y}C_xN_y)$, where: M is Sn and a second element selected from Fe, Ni, and Cu; r is selected from about 0.06, or about 0.23; x is in the range of about 0.001 to about 0.1; and y is in the range of about 0.001 to about 0.1. In some embodiments, the titanium-oxide based photocatalyst represented by the formula of $(Ti_{1-r}M_r)(O_{2-x-y}C_xN_y)$, where: M is $Sn^{2+}$ and a second element selected from $Fe^{3+}$, $Ni^{2+}$, and $Cu^{2+}$; r is selected from about 0.06, or about 0.23; x is in the range of about 0.001 to about 0.1; and y is in the range of about 0.001 to about 0.1. For example, the photocatalyst can be $(Ti_{0.94}Sn_{0.05}Fe_{0.01})(O_{2-x-y}C_xN_y)$, $(Ti_{0.94}Sn_{0.05}Ni_{0.01})(O_{2-x-y}C_xN_y)$, or $(Ti_{0.77}Sn_{0.15}Cu_{0.08})(O_{2-x-y}C_xN_y)$, where: x is in the range of about 0.001 to about 0.1; and y is in the range of about 0.001 to about 0.1.

The photocatalyst may be a solid. In some embodiments, the solid photocatalyst can include a crystalline form. For example, the photocatalyst may have a rutile or anatase crystalline phase. In some embodiments, the composition my include a combination of rutile and anatase crystalline phases. In some embodiments, at least about 10% of the photocatalyst has an anatase phase. In some embodiments, at least about 30% of the photocatalyst has an anatase phase. In some embodiments, at least about 50% of the photocatalyst has an anatase phase. In some embodiments, at least about 50% of the photocatalyst has an anatase phase. In some embodiments, at least about 50% of the photocatalyst has an anatase phase.

In some embodiments, at least about 60% of the photocatalyst has an anatase phase. In some embodiments, at least about 75% of the photocatalyst has an anatase phase. In some embodiments, at least about 80% of the photocatalyst has an anatase phase. In some embodiments, at least about 90% of the photocatalyst has an anatase phase. In some embodiments, at least about 95% of the photocatalyst has an anatase phase. In some embodiments, at least about 99% of the photocatalyst has an anatase phase. In some embodiments, the photocatalysts of the present application degrade organic materials when exposed to ultra-violet and/or visible light radiation. For example, the photocatalysts of the present application may degrade organic materials when exposed to light having a wavelength of emission in the range about 200 nm to about 800 nm.

The titania photocatalysts may, in some embodiments, have a high surface area. The present application appreciates that high surface area can improve the catalytic activity of the photocatalyst. The titania photocatalysts may, for example, have a specific surface area of no more than about 500 $m^2/g$; no more than about 300 $m^2/g$; no more than about 200 $m^2/g$; no more than about 100 $m^2/g$; no more than about 75 $m^2/g$; of no more than about 50 $m^2/g$; no more than about 40 $m^2/g$; no more than about 30 $m^2/g$; no more than about 20 $m^2/g$; no more than about 10 $m^2/g$; or no more than about 5 $m^2/g$. In some embodiments, the titania photocatalysts have a specific surface area in the range of about 2 $m^2/g$ to about 30 $m^2/g$.

Some embodiments disclosed herein include titania photocatalytic compositions. The compositions may include one or more of any of the photocatalysts disclosed in the present application. For example, the composition may include a photocatalyst represented by $(Ti_{1-r}Sn_r)(O_{2-x-y}C_xN_y)$, where: r is in the range of about 0.0001 to about 0.25; x is in the range of about 0.001 to about 0.1; and y is in the range of about 0.001 to about 0.1. The amount of photocatalyst in the composition may, for example, be at least about 0.1% by weight; at least about 1% by weight; at least about 5% by weight; at least about 10% by weight; at least about 25% by weight; at least about 50% by weight; at least about 80% by weight; at least about 90% by weight; at least about 95% by weight; or at least about 99% by weight.

The titania photocatalytic composition may also optionally include one or more noble metals. The noble metal can be, for example, Pt, Ag, Au, Rh, Rb, Re, Ir, or combinations thereof. In some embodiments, the noble metal is Pt and/or Ag. As will be discussed further below, the noble metal can be included in the composition by using a noble metal compound during the process for making the titania photocatalyst. The amount by weight of the noble metal in the composition may be effective to increase the photocatalytic properties of the composition. The amount by weight of the noble metal relative to the titanium-based photocatalyst in the composition can be, in some embodiments, about 0.001 wt % to about 10 wt %, about 0.5 wt % to about 7.5 wt %, for example about 1 wt %, about 2 wt %, about 3 wt % and/or about 5 wt %. The noble metal may form a separate phase in the composition. For example, the noble metal may form nanoparticles (e.g., particles having an average diameter of about 100 nm or less) dispersed in the titania photocatalyst phase.

Some embodiments disclosed herein include a method of decomposing a compound. The method may include contacting the compound with one or more of the photocatalysts described in the present application and exposing the photocatalyst to electromagnetic radiation having a wavelength between about 200 nm to about 800 nm, e.g., ultra-violet and/or visible radiation. In some embodiments, the compound is an organic compound. In some embodiments, the method includes a photocatalyst represented by the formula of $(Ti_{1-r}M_r)(O_{2-x-y}C_xN_y)$, where: M is Sn, Ni, Sr, Ba, Fe, Bi, V, Mo, W, Zn, Cu, or combinations thereof; r is in the range of about 0.0001 to about 0.25; x is in the range of about 0.001 to about 0.1; and y is in the range of about 0.001 to about 0.1.

Method of Making Titania Photocatalysts

Some embodiments disclosed herein include methods of making titania photocatalysts. In some embodiments, the method includes: heating a mixture with at least one liquid-phase component, preferably a mixture at a first temperature to form a solid and heating the solid at a second temperature in to obtain a photocatalytic composition, where the mixture with at least one liquid-phase component, preferably mixture may include a titanium compound and at least another metal-containing compound containing a second metal element. In some embodiments, the metal containing compound can include at least a second and third metal element. In some embodiments, the liquid-phase component can be water, e.g., an aqueous mixture. In some embodiments, the liquid-phase component can be other polar solvents, e.g., $C_1$-$C_6$ alcohols (methanol, ethanol, butanol, tert-butanol, propanol, isopropanol, etc.) In some embodiments, the titanium compounds can be an organo-titanium compound. In some embodiments, the mixture may include an organo-titanium compound and at least one organometallic compound that includes a second metal element. In some embodiments, the mixture may include compounds containing only non-metals to modify and/or facilitate reaction conditions. In some embodiments such non-metal compounds may include one or more of ammonium nitrate; urea; hydrazine-based compounds such as carbohydrazide; amino acids such as glycine, leucine, valine, serine, alanine; hydrogen peroxide; guanidine nitrate; 3-methylpyrozole-5-one; diformyl hydrazine; and hexamethylenetetramine. In some embodiments, the mixture may contain water.

Without being bound to any particular theory, it is believed that heating the mixture decomposes the components to yield the photocatalyst. The skilled artisan, guided by the teachings of the present application, will appreciate that the amount of titanium, the second metal element, carbon and nitrogen in the photocatalyst can be varied by adjusting various process conditions, such as the heating conditions and amount of -titanium, metallic and non-metal containing compounds used in the mixture.

The type of titanium compound used in the process is not particularly limited. In some embodiments, the titanium compound includes an organo-titanium compound. Further, the type of organo-titanium compound used in the process is not particularly limited. In some embodiments, the organo-titanium compound can be water-soluble. The titanium compound can be, for example, metal nitrates, metal ammonium salts, or organic metal-containing compounds. In some embodiments, the organo-titanium compound is an ester or a chelate. In some embodiments, the organo-titanium compound is an organic titanate. Non-limiting examples of organo-titanium compounds that may used include TYZOR (TM, DuPont), organic titanates like titanium(IV) bis(ammonium lactate) dihydroxide, ammonium oxo-oxalatotitanate (IV), hydroxycarboxylato-peroxotitanium, titanium lactate, titanium maleate complexes, titanium oxalate, and titanium citrate. These organo-titanium compounds may be used alone or in combination. In some embodiments, the organo-titanium compound is represented by Formula I:

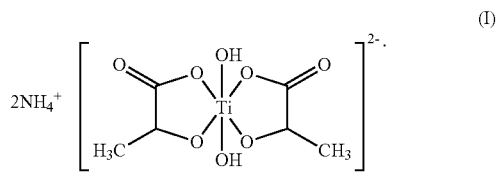

(I)

The type of metallic compound is also not particularly limited so long as it includes a second metal element other than titanium. In some embodiment the metallic compound is an organometal. In some embodiments, the organometallic compound is water-soluble. The organometallic compound may, for example, include a second metal element selected from Sn, Ni, Sr, Ba, Fe, Bi, V, Mo, W, Zn, Cu, and combinations thereof. In some embodiments, the second metal element is Sn. Non-limiting examples of metal compounds include nitrates, chlorides, sulfates, metal ammonium complexes like ammonium metavanadate, citrates, acetates, acetylacetonates, octoates, and hexanoates. Non-limiting examples of organometallic compounds include stannous octoate, tin(IV)-oxine complexes, dibutyl tin, tetrabutyl tin, metallocenes including ferrocene and nickelocene, ferrates, vanadates, molybdates, zincates and cuprates. The skilled artisan, guided by the teachings of the present application, will appreciate that the choice of a particular metal compound is only influenced by the metal contained in the compound and not by the nature of the compound itself. These second-metal compounds may be used alone or in combination. In some embodiments, titanium and one or more of the secondary metals are contained in the same precursor.

The relative amount of the titanium compound and the second metallic compound may be selected based on the desired ratio of titanium to the other metal elements. In some embodiments, the relative amount of the titanium compound to the metallic compounds can be selected so that the molar ratio of the titanium to the second metal element in the aqueous mixture is in the range of about 10,000:1 to about 3:1. The relative amount of the organo-titanium compound to the organometallic compound can be selected so that the molar ratio of the titanium to the second metal element in the aqueous mixture is, for example, no more than about 10,000:1; no more than about 5,000:1; no more than about 1,000:1; no more than about 500:1; no more than about 250:1; no more than about 100:1; no more than about 50:1; no more than about 20:1; no more than about 10:1; or no more than about 5:1. The relative amount of the organo-titanium compound to the organometallic compound can be selected so that the molar ratio of the titanium to the second metal element in the aqueous mixture is, for example, at least about 3:1; at least about 5:1; at least about 10:1; at least about 50:1; at least about 100:1; or at least about 200:1.

The mixture may also optionally include other organic or inorganic compounds to adjust the composition of the photocatalyst produced or aid the decomposition of the compounds into the photocatalyst. In some embodiments, the optionally included other organic or inorganic compounds can be combustible compounds and/or oxidizing agents. Non-limiting examples of optional combustible compounds in the mixture include one or more of urea, hydrazine-based compounds like carbohydrazide, amino acids including glycine, leucine, valine, serine, alanine; 3-methylpyrozole-5-one, diformyl hydrazine, and hexamethylenetetramine. Non-limiting examples of optional oxidizing compounds in the mixture include one or more of ammonium nitrate, hydrogen peroxide, and guanidine nitrate. In some embodiments, the mixture may contain water. In some embodiments, the optionally included compounds can be sources of C and/or N for the photocatalyst composition.

The mixture may, in some embodiments, include a noble metal compound that can be used to form a solid mixture (e.g., an alloy) having the photocatalyst and the noble metal using the processes disclosed herein. The noble metal compound can be configured to decompose into a noble metal upon heating during the method of making the titania photocatalysts. The noble metal compound can be an organic or inorganic compound. The noble metal compound can include one or more noble metals, such as Pt, Ag, Au, Rh, Rb, Re, and/or Ir. In some embodiments, the noble metal compound comprises Pt and/or Ag. Non-limiting examples of noble metal compounds include silver nitrate, tetramine platinum(II) nitrate, rhodium nitrate, platinum (II) oxalate, and silver lactate. In some embodiments, the noble metal compound is a nitrate or an oxalate. The amount of the noble metal compound can be selected based on the desired amount of noble metal in the final composition.

The heating conditions for changing the mixture to a solid are not particularly limited and may be selected so that the heating obtains a solid. In some embodiments, the heating conditions for the mixture are sufficient for the organo-titanium compound and an organometallic compound to combust. The mixture can be heated at a temperature of, for example, at least about 100° C., at least about 150° C., at least about 250° C.; at least about 300° C.; or at least about 350° C. The mixture can be heated at a temperature of, for example, no more than about 800° C., no more than about 700° C., no more than about 600° C., no more than about 500° C.; no more than about 450° C.; no more than about 400° C.; or no more than about 350° C. In some embodiments, the mixture can be heated at a temperature in the range of about 150° C. to about 500° C.

The time period of heating the aqueous mixture may also vary. The mixture may be heated, for example, for at least about 1° seconds, at least about 1 minute, at least about 3 minutes, at least about 5 minutes; at least about 10 minutes; at least about 15 minutes; or at least about 20 minutes. The mixture may be heated, for example, for no more than about 10 hours, no more than about 5 hours, no more than about 1 hour; no more than about 30 minutes; no more than about 25 minutes; no more than about 20 minutes; no more than about 15 minutes; or no more than about 10 minutes. In some embodiments, the mixture may be heated in a time period in the range of about 5 minutes to about 30 minutes. In some embodiments, the mixture may be heated for a time period of at least about 5 minutes. In some embodiments, the mixture to be heated is an aqueous mixture.

After the mixture is changed into a solid, the solid can be heated to further adjust the carbon and nitrogen content in the photocatalyst. The solid can be heated at a temperature of, for example, at least about 150° C., at least about 250° C., at least about 350° C.; at least about 400° C.; at least about 425° C.; or at least about 450° C. The solid can be heated at a temperature of, for example, no more than about 650° C., no more than about 550° C.; no more than about 500° C.; or no more than about 450° C. In some embodiments, the solid can be heated at a temperature in the range of about 250° C. to about 500° C.

The time period of heating the solid may also vary. In some embodiments, the heating of the solid may be sufficient to yield a photocatalyst composition have no more than about 5% by mole of carbon relative to a total amount of metal elements. Without being bound to any particular theory, it is believed that heating the solid decomposes carbon and nitrogen components in the photocatalyst. This heating step may also modify phase structure of the solid (e.g., at least partial conversion of anatase phase to rutile phase). The solid may be heated, for example, for at least about 1 minute, at least about 10 minutes, at least about 30 minutes; at least about 1 hour; at least about 90 minutes; or at least about 2 hours. The solid may be heated, for example, for no more than about 10 hours, no more than about 3 hours; no more than about 2 hours; no more than about 90 minutes; no more than about 1 hour; or no more than about 45 minutes. In some embodiments, the solid may be heated in a time period in the range of about 30 minutes to about 3 hours. In some embodiments, the mixture may be heated for a time period of at least about 30 minutes. As one non-limiting example, the solid may be heated at about 475° C. for about 1 hour.

The skilled artisan, guided by the teachings of the present application, will appreciate that the steps of heating the mixture and the solid may be combined into a single operation. For example, the mixture may be heated at about 350° C. for a sufficient time to change the mixture to a solid and then maintained at the same temperature for a period of time sufficient to achieve the desired amounts of carbon and nitrogen in the photocatalyst. The total period of time for heating in this combined operation may, for example, be about 65 minutes. In some embodiments, the mixture is heated at different conditions than the solid.

The methods disclosed in the present application may produce any of the photocatalysts disclosed herein. In some embodiments, the method produced a photocatalyst represented by the formula of $(Ti_{1-r}M_r)(O_{2-x-y}C_xN_y)$, where: M is Sn, Ni, Sr, Ba, Fe, Bi, V, Mo, W, Zn, Cu, or combinations thereof; r is in the range of about 0.0001 to about 0.25; x is in the range of about 0.001 to about 0.1; and y is in the range of about 0.001 to about 0.1. In some embodiments, the photocatalyst may include an anatase phase or a rutile phase.

EXAMPLES

Additional embodiments are disclosed in further detail in the following examples, which are not in any way intended to limit the scope of the claims.

Example 1

Compound A Synthesis

A 50 wt. % aqueous solution of TYZOR LA (25 mL, Sigma Aldrich, St. Louis, Mo., USA) was preheated to 350° C. in a furnace (Barnstead Thermolyne 47900, Dubuque, Iowa, USA) for about 20-30 min. for combustion and formation of voluminous black powder. After no further gases were perceived, the resultant powder was transferred into a large glass petri dish (100×50) without crushing, heated to 475° C. and maintained at this temperature for about 1 h. The petri dish was then cooled to room temperature to yield a yellowish powder. The yellowish powder (Compound A) was crushed by hand in a pestle and mortar for characterization and photocatalysis evaluation.

Example 2

Synthesis of Compound B, C, and D

Comparative Compound A (P25 Titania) was obtained from Evonik (Evonik Degussa Corp., Parsippany, N.J., USA). Compounds B, C, and D were prepared in a similar manner to Example 1, except that varying levels of TYZOR LA and additional precursors were added to TYZOR LA prior to combustion, as indicated in TABLE 1 below:

TABLE 1

Precursor Materials for Compounds in Examples 1 and 2

| Compound | Composition | TYZOR LA (50%) amount | Additional precursor |
| --- | --- | --- | --- |
| Compound A | $TiO_{1.9848}C_{0.0106}N_{0.005}$ | 25 ml | none |
| Compound B | $TiO_{1.987}C_{0.008}N_{0.005}$ | 25 ml | 14.5 g Urea |
| Compound C | $TiO_{1.9344}C_{0.0169}N_{0.0487}$ | 25 ml | 14.5 g carbohydrazide |
| Compound D | $TiO_{1.9706}C_{0.0164}N_{0.013}$ | 10 ml | 14 g $NH_4NO_3$ |
| Comparative A* | $TiO_2$ (theoretical) | | |

*Comparative Compound A is Titania P25 from Evonik.

Example 3

Synthesis of Compounds E through AB

Compounds E through AD were prepared in a similar manner to Example 1, except that varying levels of TYZOR LA and additional precursors as indicated in TABLE 2 below were added prior to combustion. For Compounds AC and AD, noble metal compounds were included as additional precursors to obtain catalytic composition having a noble metal.

TABLE 2

Precursor Materials for Compounds in Examples 1 and 2

| Compound | Composition | TYZOR LA (50%) amount | Additional precursor |
| --- | --- | --- | --- |
| Compound E | $Ti_{0.95}Sn_{0.05}O_{2-x-y}C_xN_y$ | 10 ml | Sn octoate = 0.45 g; 7 g $NH_4NO_3$ |
| Compound F | $Ti_{0.90}Sn_{0.10}O_{2-x-y}C_xN_y$ | 10 ml | Sn octoate = 0.842 g; 7 g $NH_4NO_3$ |
| Compound G | $Ti_{0.85}Sn_{0.15}O_{2-x-y}C_xN_y$ | 10 ml | Sn octoate = 1.262 g; 5 g $NH_4NO_3$ |
| Compound H | $Ti_{0.95}Zn_{0.5}O_{2-x-y}C_xN_y$ | 10 ml | $Zn(NO_3)_2 \cdot 6H_2O$ 5 g $NH_4NO_3$ |
| Compound I | $Ti_{0.985}Ni_{0.015}O_{2-x-y}C_xN_y$ | 10 ml | $NH_4NO_3$ = 10 g $Ni(NO_3)_2 \cdot 6H_2O$ = 0.078 g |
| Compound J | $Ti_{0.98}Ni_{0.02}O_{2-x-y}C_xN_y$ | 10 ml | $NH_4NO_3$ = 10 g $Ni(NO_3)_2 \cdot 6H_2O$ = 0.11 g |
| Compound K | $Ti_{0.99}Sr_{0.01}O_{2-x-y}C_xN_y$ | 10 ml | $NH_4NO_3$ = 7 g $Sr(NO_3)_2$ = 0.044 g |
| Compound L | $Ti_{0.97}Sr_{0.03}O_{2-x-y}C_xN_y$ | 10 ml | $NH_4NO_3$ = 7 g $Sr(NO_3)_2$ = 0.132 g |
| Compound M | $Ti_{0.95}Sr_{0.05}O_{2-x-y}C_xN_y$ | 10 ml | $NH_4NO_3$ = 7 g $Sr(NO_3)_2$ = 0.219 g |
| Compound N | $Ti_{0.97}Ba_{0.03}O_{2-x-y}C_xN_y$ | 10 ml | $NH_4NO_3$ = 7 g $Ba(NO_3)_2$ = 0.163 g |
| Compound O | $Ti_{0.95}Ba_{0.05}O_{2-x-y}C_xN_y$ | 10 ml | $NH_4NO_3$ = 7 g $Ba(NO3)2$ = 0.271 g |
| Compound P | $Ti_{0.94}Sn_{0.05}Fe_{0.01}O_{2-x-y}C_xN_y$ | 10 ml | $NH_4NO_3$ = 7 g Sn octoate = 0.43 g; $Fe(NO3)3 \cdot 9H_2O$ = 0.086 g |
| Compound Q | $Ti_{0.94}Sn_{0.05}Ni_{0.01}O_{2-x-y}C_xN_y$ | 10 ml | $NH_4NO_3$ = 7 g Sn octoate = 0.43 g; $Ni(NO_3)_2 \cdot 6H_2O$ = 0.06 g |
| Compound R | $Ti_{0.94}Sn_{0.05}Fe_{0.01}O_{2-x-y}C_xN_y$ | 10 ml | $NH_4NO_3$ = 7 g $Fe(NO_3)_3 \cdot 9H_2O$ = 0.084 g |
| Compound S | $Ti_{0.77}Sn_{0.15}Fe_{0.08}O_{2-x-y}C_xN_y$ | 10 ml | $NH_4NO_3$ = 4 g Sn octoate = 1.28 g; $Cu(NO_3)_2 \cdot 6H_2O$ = 0.039 g |
| Compound T | $Ti_{0.9}Bi_{0.1}O_{2-x-y}C_xN_y$ | 5 ml | $NH_4NO_3$ = 3.5 g $Bi(NO_3)3 \cdot 5H2O$ = 0.5 g |
| Compound U | $Ti_{0.996}V_{0.004}O_{2-x-y}C_xN_y$ | 10 ml | $NH_4NO_3$ = 14 g $NH_4VO_3$ = 0.01 g |
| Compound V | $Ti_{0.984}V_{0.016}O_{2-x-y}C_xN_y$ | 10 ml | $NH_4NO_3$ = 14 g $NH_4VO_3$ = 0.039 g |

TABLE 2-continued

Precursor Materials for Compounds in Examples 1 and 2

| Compound | Composition | TYZOR LA (50%) amount | Additional precursor |
|---|---|---|---|
| Compound W | $Ti_{0.97}V_{0.03}O_{2-x-y}C_xN_y$ | 10 ml | $NH_4NO_3$ = 14 g<br>$NH_4VO_3$ = 0.1 g |
| Compound X | $Ti_{0.997}Mo_{0.003}O_{2-x-y}C_xN_y$ | 10 ml | $NH_4NO_3$ = 14 g<br>$(NH_4)_6Mo_7O_{24} \cdot 4H_2O$ = 0.01 g |
| Compound Y | $Ti_{0.984}Mo_{0.016}O_{2-x-y}C_xN_y$ | 10 ml | $NH_4NO_3$ = 14 g<br>$(NH_4)_6Mo_7O_{24} \cdot 4H_2O$ = 0.059 g |
| Compound Z | $Ti_{0.957}Mo_{0.043}O_{2-x-y}C_xN_y$ | 10 ml | $NH_4NO_3$ = 14 g<br>$(NH_4)_6Mo_7O_{24} \cdot 4H_2O$ = 0.157 g |
| Compound AA | $Ti_{0.97}W_{0.03}O_{2-x-y}C_xN_y$ | 10 ml | $NH_4NO_3$ = 7 g<br>Ammonium meta tungstate = 0.157 g |
| Compound AB | $Ti_{0.95}W_{0.05}O_{2-x-y}C_xN_y$ | 10 ml | $NH_4NO_3$ = 7 g<br>Ammonium meta tungstate = .26 g |
| Compound AC | $Ti_{0.85}Sn_{0.15}O_{2-x-y}C_xN_y$: Pt | 7 ml | Sn octoate = 0.88 g;<br>3.5 g $NH_4NO_3$<br>Tetramine platinum (II) nitrate = 1.15 gm |
| Compound AD | $Ti_{0.85}Sn_{0.15}O_{2-x-y}C_xN_y$: Ag | 10 ml | Sn octoate = 1.28 g;<br>5 g $NH_4NO_3$<br>Silver nitrate = 0.104 gm |

Example 4

Nitrogen and Carbon Content of Photocatalysts

The carbon and nitrogen content was determined, using Leco Corp. (St. Joseph, Mich., USA), CS600 and TC600, respectively, using standard operating procedures from Leco, for the four titania compositions (Compounds A-D) produced according to the processes described above in Examples 1 and 2. The results are shown in TABLE 3 below and demonstrate that modifying the components in the mixture can adjust the carbon and nitrogen content in the photocatalyst.

The samples were also analyzed using powder x-ray diffraction using Cu K-alpha radiation (Rigaku Miniflex II, Rigaku Americas, Woodland, Tex., USA). The full-width at half-maximum (FWE1M) for the characteristic peak at 25.281° 2θ, which corresponds to the reflection of the (101) plane of the anatase phase, is shown in TABLE 3 below. The results for Comparative Composition A are shown for comparison.

The specific surface area (SSA) for the samples was also determined using standard nitrogen adsorption BET (Micromeritics Gemini V, Micromeritics Instruments Corp., Norcross, Ga., USA). These results are also provided in TABLE 3 below.

TABLE 3

Co-doped Titania Properties

| Compound | Nominal Composition | FWHM | SSA ($m^2/g$) |
|---|---|---|---|
| Compound A | $TiO_{1.9848}C_{0.0106}N_{0.005}$ | 0.616 | 18.64 |
| Compound B | $TiO_{1.987}C_{0.008}N_{0.005}$ | 0.629 | 26.00 |
| Compound C | $TiO_{1.9344}C_{0.0169}N_{0.0487}$ | 0.725 | 4.00 |
| Compound D | $TiO_{1.9706}C_{0.0164}N_{0.013}$ | 0.454 | 10.37 |
| Comparative Compound A | $TiO_2$ (theoretical) | 0.413 | 53.00 |

Example 5

Powder X-ray Diffraction

The crystalline structure for the photocatalysts compounds D, E, F, and G were analyzed using powder X-ray diffraction. The results are shown in FIG. 1. These results indicate that the photocatalysts include an anatase crystalline structure.

Example 6

Diffuse Reflectance Spectroscopy (DRS)

Figure 2:
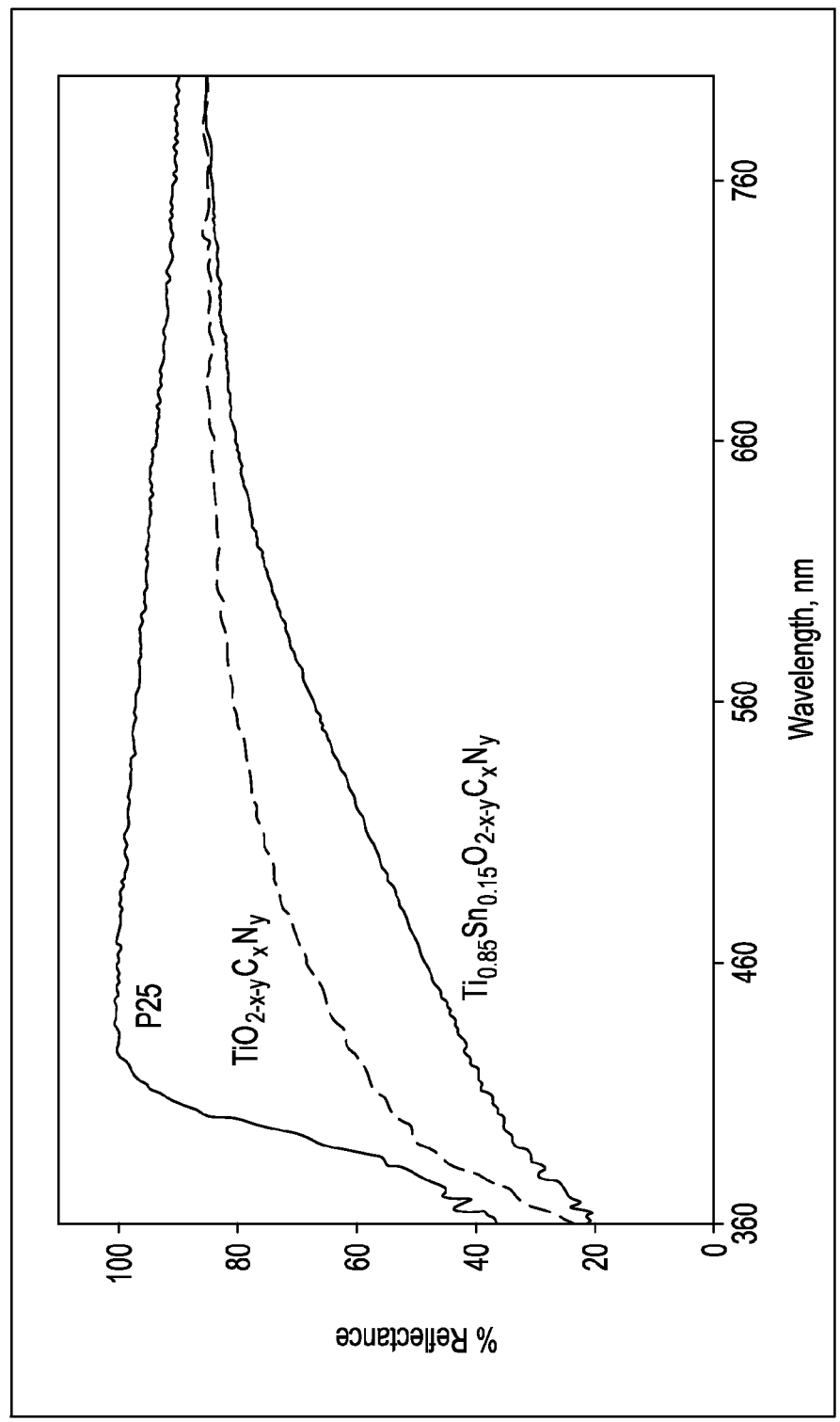
FIG. 2 shows the diffuse reflectance spectra for Compound D, Compound G, and Comparative Compound A prepared according to Examples 2 and 3.

Compounds D, G, and Comparative Compound A prepared as described in Example 2 were analyzed using diffuse reflectance spectroscopy (DRS). The results are shown in FIG. 2 and indicate that tin doping improves absorption in the visible spectrum (400 nm to 800 nm).

Example 7

Effect of Heating Conditions

A mixture of TYZOR LA (10 mL of 50 wt % in water, Sigma Aldrich) and stannous octoate liquid (1.262 g, Spectrum Chemicals) was prepared and then heated at about 100° C. for about 20 min. To this mixture, 5 g ammonium nitrate was added and then the mixture was placed in a furnace (Barnstead Thermolyne 47900) which was preheated to 350° C. After about 20 min. at this temperate, a voluminous foamy black powder was produced. The resulting material was transferred into a PYREX petri dish and annealed at different temperatures and times: (i) 400° C., for about 2 h; (ii) 475° C., for about 1 h; (iii) 475° C., for about 2 h; and (iv) 475° C., for about 3 h.

Figure 3:
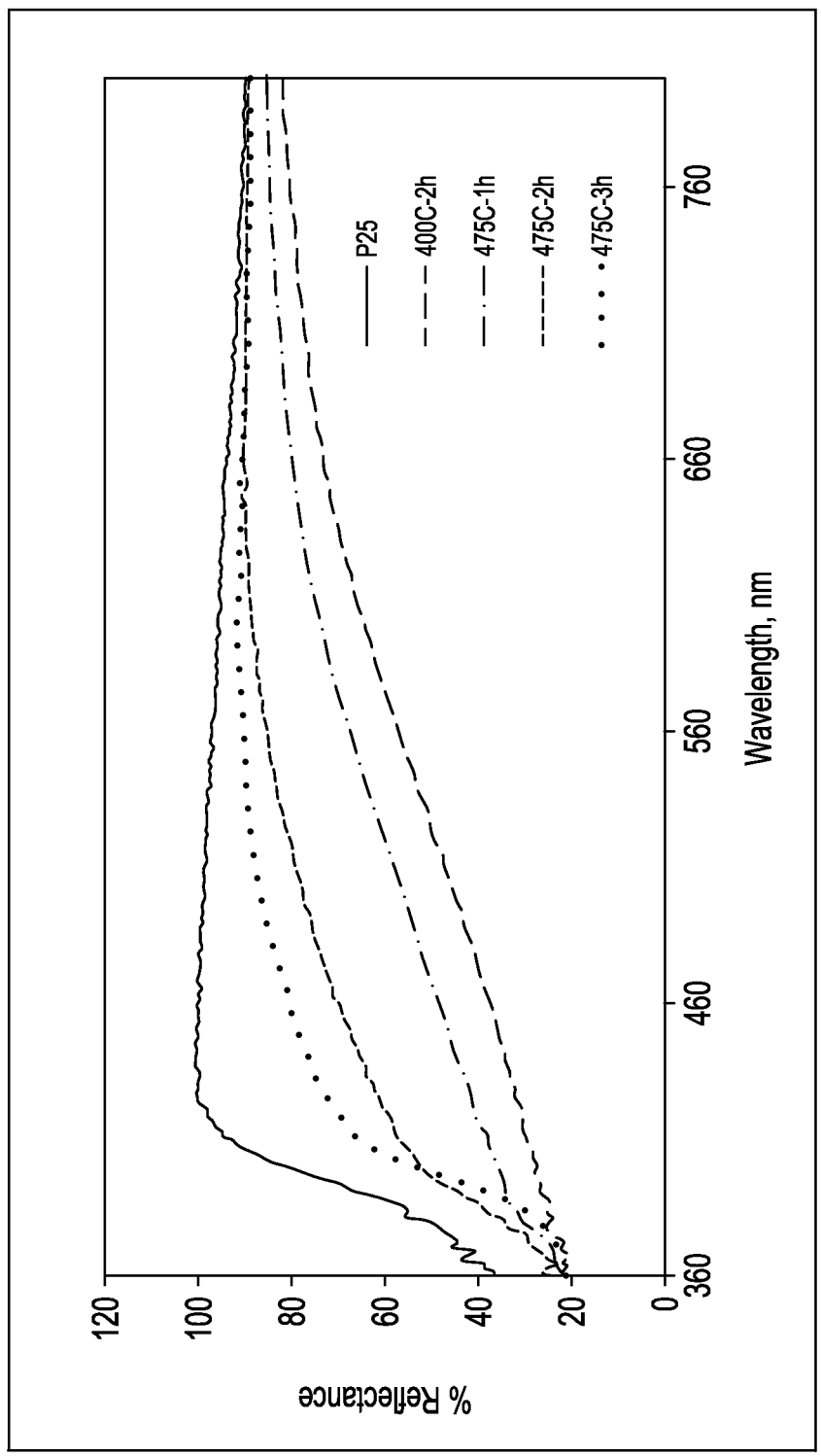
FIG. 3 shows powder x-ray diffraction patterns for tin-doped titania samples prepared under different heating conditions described in Example 7.

FIG. 3 shows diffuse reflectance spectroscopy results for the four photocatalysts heated under conditions (i) through (iv) above, and Comparative Example A (titania P25, Evonik).

Example 8

Photocatalyst Properties for Methylene Blue

Figure 4:
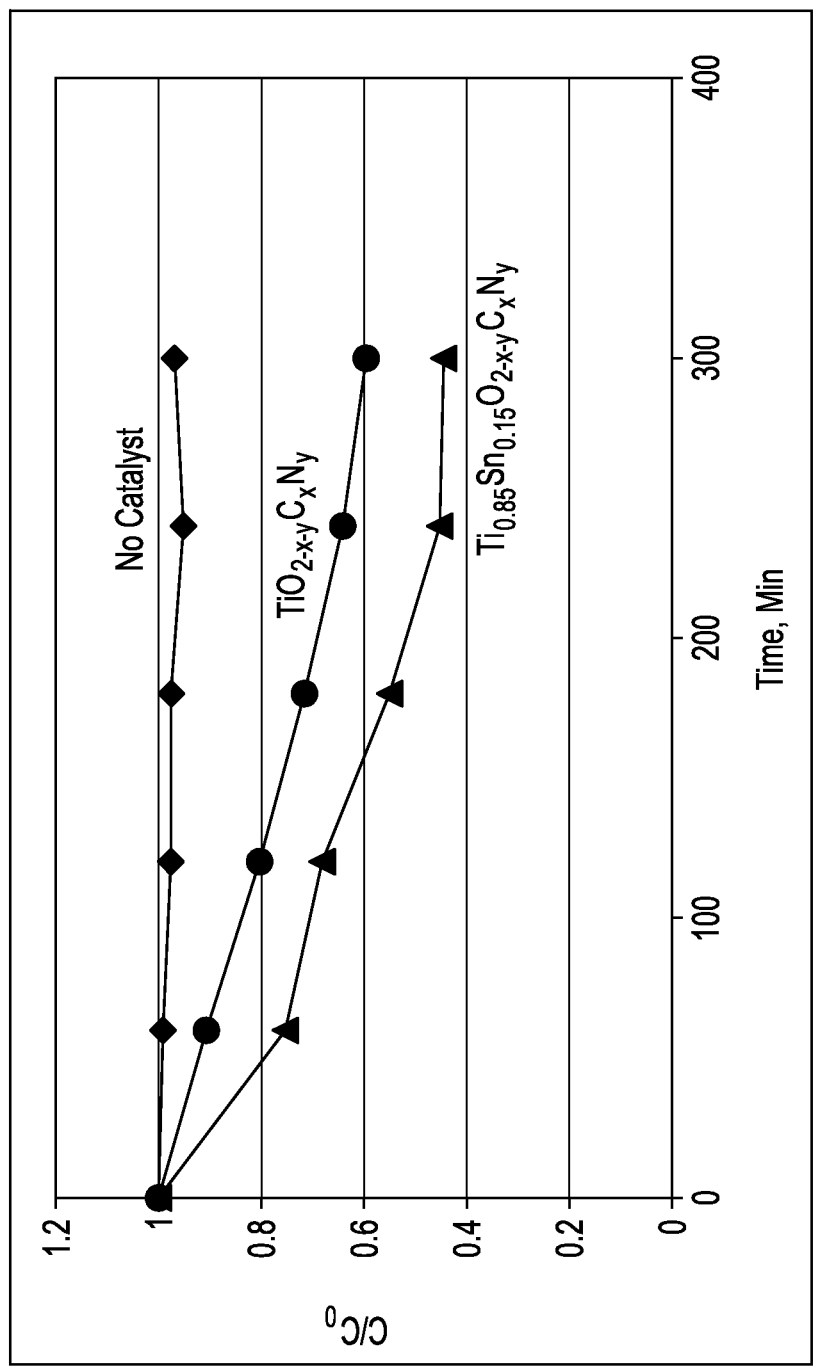
FIG. 4 is a graph showing the decomposition of methylene blue by Compound D and G prepared according to Examples 2 and 3.

The photocatalytic properties for compounds D and G were compared by measuring the degradation of methylene blue. 150 mg of each sample was placed in an aqueous solution of 35 ml of methylene blue (MB) for about 3 hours without any light and then exposed to a blue light emitting diode (455 nm, 3.5 mW/cm$^2$) for about 5 hours. The degradation of methylene blue was measured about every hour by monitoring its concentration using UV-Vis absorption spectroscopy (Cary-50, Spectrophotometer Agilent Technologies, Santa Clara, Calif., USA). The concentration was calculated as the area under the UV-Vis absorption spectrum between 400 and 800 nm. The results are shown in FIG. 4 along with the control where methylene blue solution was exposed to similar lighting without any photocatalyst.

Example 9

Photocatalyst Properties for Methylene Blue

The photocatalytic properties were also compared to commercially available photocatalyst including P25. The testing was completed under generally the same conditions as Example 8 and the total degradation of methylene blue after 5 hours is shown in Table 4.

TABLE 4

Total Degradation of Methylene Blue after 5 Hours

| Catalyst | % Degradation of Methylene Blue |
| --- | --- |
| No catalyst | 3.25 |
| P25 | 6.54 |
| $TiO_{2-x-y}C_xN_y$ | 28.86 |
| $Ti_{0.95}Sn_{0.05}O_{2-x-y}C_xN_y$ | 47.62 |
| $Ti_{0.90}Sn_{0.10}O_{2-x-y}C_xN_y$ | 49.35 |
| $Ti_{0.85}Sn_{0.15}O_{2-x-y}C_xN_y$ | 53.53 |
| $Ti_{0.95}Zn_{0.05}O_{2-x-y}C_xN_y$ | 38.89 |

What is claimed is:

1. A titanium-oxide based photocatalyst represented by the formula of $(Ti_{1-r}M_r)(O_{2-x-y}C_xN_y)$ wherein:
   M is selected from the group consisting of Sn, Ni, Sr, Ba, Fe, V, Mo, W, Zn, Cu, and combinations thereof;
   r is in the range of about 0.0001 to about 0.25;
   x is in the range of about 0.001 to about 0.1;
   y is in the range of about 0.001 to about 0.1; and
   wherein the photocatalyst comprises at least 10% anatase phase.

2. The photocatalyst of claim 1, wherein r is no more than about 0.05.

3. The photocatalyst of claim 1, wherein M is selected from the group consisting of Sn, Ni, Sr, Ba, Fe, Bi, and combinations thereof.

4. The photocatalyst of claim 3, wherein r is in the range of about 0.0001 to about 0.15.

5. The photocatalyst of claim 1, wherein M is selected from the group consisting of Mo, W, and combinations thereof.

6. The photocatalyst of claim 5, wherein r is in the range of about 0.0001 to about 0.10.

7. The photocatalyst of claim 1, wherein M is V.

8. The photocatalyst of claim 7, wherein r is in the range of about 0.0001 to about 0.05.

9. The photocatalyst of claim 1, wherein M is Sn.

10. The photocatalyst of claim 1, wherein x is in the range of about 0.001 to about 0.07.

11. The photocatalyst of claim 1, wherein y is in the range of about 0.001 to about 0.05.

12. The photocatalyst of claim 1, wherein the photocatalyst is selected from the group consisting of $(Ti_{0.99}Sn_{0.01})(O_{2-x-y}C_xN_y)$, $(Ti_{0.97}Sn_{0.03})(O_{2-x-y}C_xN_y)$, $(Ti_{0.95}Sn_{0.05})(O_{2-x-y}C_xN_y)$, $(Ti_{0.90}Sn_{0.10})(O_{2-x-y}C_xN_y)$, $(Ti_{0.85}Sn_{0.15})(O_{2-x-y}C_xN_y)$, $(Ti_{0.985}Ni_{0.015})(O_{2-x-y}C_xN_y)$, $(Ti_{0.98}Ni_{0.02})(O_{2-x-y}C_xN_y)$, $(Ti_{0.97}Ni_{0.03})(O_{2-x-y}C_xN_y)$, $(Ti_{0.99}Sr_{0.01})(O_{2-x-y}C_xN_y)$, $(Ti_{0.97}Sr_{0.03})(O_{2-x-y}C_xN_y)$, $(Ti_{0.95}Sr_{0.05})(O_{2-x-y}C_xN_y)$, $(Ti_{0.97}Ba_{0.03})(O_{2-x-y}C_xN_y)$, $(Ti_{0.95}Ba_{0.05})(O_{2-x-y}C_xN_y)$, $(Ti_{0.94}Sn_{0.05}Fe_{0.01})(O_{2-x-y}C_xN_y)$, $(Ti_{0.94}Sn_{0.05}Ni_{0.01})(O_{2-x-y}C_xN_y)$, $(Ti_{0.99}Fe_{0.01})(O_{2-x-y}C_xN_y)$, $(Ti_{0.95}Zn_{0.05})(O_{2-x-y}C_xN_y)$, $(Ti_{0.77}Sn_{0.15}Cu_{0.08})(O_{2-x-y}C_xN_y)$, $(Ti_{0.85}Zn_{0.15})(O_{2-x-y}C_xN_y)$, $(Ti_{0.90}Bi_{0.10})(O_{2-x-y}C_xN_y)$, $(Ti_{0.996}V_{0.004})(O_{2-x-y}C_xN_y)$, $(Ti_{0.984}V_{0.016})(O_{2-x-y}C_xN_y)$, $(Ti_{0.970}V_{0.03})(O_{2-x-y}C_xN_y)$, $(Ti_{0.997}Mo_{0.003})(O_{2-x-y}C_xN_y)$, $(Ti_{0.984}Mo_{0.016})(O_{2-x-y}C_xN_y)$, $(Ti_{0.957}Mo_{0.043})(O_{2-x-y}C_xN_y)$, $(Ti_{0.97}W_{0.03})(O_{2-x-y}C_xN_y)$, and $(Ti_{0.95}W_{0.05})(O_{2-x-y}C_xN_y)$.

13. The photocatalyst of claim 12, wherein the photocatalyst is selected from the group consisting of $(Ti_{0.95}Sn_{0.05})(O_{2-x-y}C_xN_y)$, $(Ti_{0.90}Sn_{0.10})(O_{2-x-y}C_xN_y)$, and $(Ti_{0.85}Sn_{0.15})(O_{2-x-y}C_xN_y)$.

14. A composition comprising the photocatalyst of claim 1 and a noble metal.

15. A composition comprising a photocatalyst and a noble metal,
   wherein the photocatalyst is a titanium-oxide based photocatalyst represented by the formula of $(ti_{1-r}M_r)(O_{2-x-y}C_xN_y)$, wherein:
   M is selected from the group consisting of Sn, Ni, Sr, Ba, Fe, Bi, V, Mo, W, Zn, Cu, and combinations thereof;
   r is in the range of about 0.0001 to about 0.25;
   x is in the range of about 0.001 to about 0.1;
   y is in the range of about 0.001 to about 0.1; and
   wherein the noble metal is selected from the group consisting of Pt, Ag, Au, Rh, Rb, Re, Ir and combinations thereof.

16. The composition of claim 15, wherein the noble metal is selected from the group consisting of Pt, Ag, and combinations thereof.

17. A method of photocatalytically decomposing a compound, the method comprising:
   heating the compound with a photocatalyst; and
   exposing the photocatalyst to electromagnetic radiation having a wavelength between about 200 nm to about 800 nm;
   wherein the photocatalyst is a titanium-oxide based photocatalyst represented by the formula of $(Ti_{1-r}M_r)(O_{2-x-y}C_xN_y)$, wherein:
   M is selected from the group consisting of Sn, Ni, Sr, Ba, Fe, Bi, V, Mo, W, Zn, Cu, and combinations thereof;
   r is in the range of about 0.0001 to about 0.25;
   x is in the range of about 0.001 to about 0.1; and
   y is in the range of about 0.001 to about 0.1.

18. A method of making a photocatalytic composition, the method comprising:

heating a mixture at a first temperature in the range of about 100° C. to about 800° C. for a heating time of at least about 10 seconds to form a solid, wherein the mixture comprises:
a titanium compound; and
at least one second metallic compound that comprises at least a second metal element,
wherein the molar ratio of the titanium to the second metal element in the mixture is in the range of about 10,000:1 to about 3:1; and
heating the solid at a second temperature in the range of about 150° C. to about 650° C. for at least about 1 minute to obtain a photocatalytic composition; and
wherein the photocatalytic composition is represented by the formula of $(Ti_{1-r}M_r)(O_{2-x-y}C_xN_y)$, wherein:
  M is selected from Sn, Ni, Sr, Ba, Fe, Bi, V, Mo, W, Zn, Cu and combinations thereof;
  r is in the range of about 0.0001 to about 0.25;
  x is in the range of about 0.001 to about 0.1; and
  y is in the range of about 0.001 to about 0.1.

* * * * *